(12) United States Patent
Boudou et al.

(10) Patent No.: US 9,971,347 B2
(45) Date of Patent: May 15, 2018

(54) POSITIONING DEVICE FOR A REMOTE CONTROL OF A HEAVY DUTY VEHICLE OR AN AGRICULTURAL VEHICLE

(71) Applicant: Robert Bosch GmbH, Stuttgart (DE)

(72) Inventors: Jean-Luc Boudou, Saint-Andre-de-Corcy (FR); Marcel Blanco, Bron (FR)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 14/922,255

(22) Filed: Oct. 26, 2015

(65) Prior Publication Data

US 2016/0124430 A1    May 5, 2016

(30) Foreign Application Priority Data

Oct. 29, 2014  (EP) ..................................... 14190833

(51) Int. Cl.
*G05D 1/00* (2006.01)
*E02F 9/20* (2006.01)
(Continued)

(52) U.S. Cl.
CPC ......... *G05D 1/0016* (2013.01); *E02F 9/2004* (2013.01); *G05G 1/04* (2013.01);
(Continued)

(58) Field of Classification Search
CPC .. G05G 1/04; G05G 1/06; G05G 5/04; G05G 5/03; G05G 5/06; E02F 9/2004;
(Continued)

(56) References Cited

U.S. PATENT DOCUMENTS 2,234,563 A * 3/1941 Kneass .................. H01H 1/502
200/48 R
2,244,346 A * 6/1941 Rickmeyer ............ H01H 29/20
200/187
(Continued)

FOREIGN PATENT DOCUMENTS

| CH | 335458 | 2/1959 |
|---|---|---|
| DE | 10 2005 008 300 A1 | 8/2006 |
| EP | 2 687 937 A1 | 1/2014 |
| WO | 2006/114075 A1 | 11/2006 |
| WO | 2014/048661 A1 | 4/2014 |

OTHER PUBLICATIONS

European Search Report corresponding to EP 14190833.5, dated Jul. 17, 2015 (English language document) (6 pages).

*Primary Examiner* — Daniel D Yabut
(74) *Attorney, Agent, or Firm* — Maginot, Moore & Beck LLP

(57) ABSTRACT

A positioning device for a remote control of a heavy duty vehicle or agricultural vehicle includes an elastic element. The elastic element has a fastening portion, configured to be secured to a body of the remote control, and a retaining portion, arranged to cooperate with an actuator of the remote control at a threshold position delimiting a first portion of a displacement trajectory of the actuator, and a second portion of the displacement trajectory, so as to oppose movement of the actuator according to its displacement trajectory along at least one displacement direction upon switching of said threshold position and allow switching at the threshold position in said displacement direction as a result of application of a threshold switching force exerted on the actuator. The threshold switching force is higher than a displacement force necessary for movement of the actuator on the first or second portion of the displacement trajectory.

14 Claims, 3 Drawing Sheets

(51) Int. Cl.
*G05G 1/04* (2006.01)
*G05G 5/00* (2006.01)
*G05G 5/03* (2008.04)
*G05G 5/06* (2006.01)
*G05G 1/30* (2008.04)

(52) U.S. Cl.
CPC ................ *G05G 5/00* (2013.01); *G05G 5/03* (2013.01); *G05G 5/06* (2013.01); *G05D 2201/0201* (2013.01); *G05D 2201/0202* (2013.01); *G05G 1/30* (2013.01)

(58) Field of Classification Search
CPC .... G05D 1/0016; H01H 23/168; H01H 21/28; H01H 1/44; H01H 1/26; Y10T 74/2093; Y10T 74/2063; Y10T 74/20642; Y10T 74/2066; Y10T 74/20636; Y10T 74/20672; Y10T 74/20648; Y10T 74/2014; Y10T 74/201459; Y10T 74/20128; Y10T 74/20116; Y10T 74/20171; F16H 2061/245; F16H 2061/243; F16H 2061/247; F16H 2061/242; F16H 2061/241; F16H 61/24
See application file for complete search history.

(56) References Cited

U.S. PATENT DOCUMENTS

| | | | | |
|---|---|---|---|---|
| 2,626,335 A | * | 1/1953 | Landin | H01H 23/168 200/295 |
| 2,958,233 A | | 11/1960 | Johnson | |
| 2,969,442 A | * | 1/1961 | Benander | H01H 23/12 200/556 |
| 3,401,574 A | | 9/1968 | Doolittle | |
| 3,403,236 A | * | 9/1968 | Zoludow | H01H 23/145 200/339 |
| 3,427,415 A | * | 2/1969 | Avner | H01H 23/164 200/16 C |
| 4,633,728 A | * | 1/1987 | May | F16H 61/18 74/473.28 |
| 4,738,153 A | * | 4/1988 | Sabel | F16H 61/18 74/473.22 |
| 5,339,705 A | * | 8/1994 | Shirahama | F16H 59/10 74/473.27 |
| 6,209,418 B1 | | 4/2001 | Kalsi et al. | |
| 2005/0006218 A1 | * | 1/2005 | Kwong | H01H 1/26 200/553 |
| 2008/0163714 A1 | * | 7/2008 | Wang | F16H 61/24 74/473.23 |
| 2012/0103122 A1 | * | 5/2012 | Morrissett | F16H 59/10 74/473.25 |

* cited by examiner

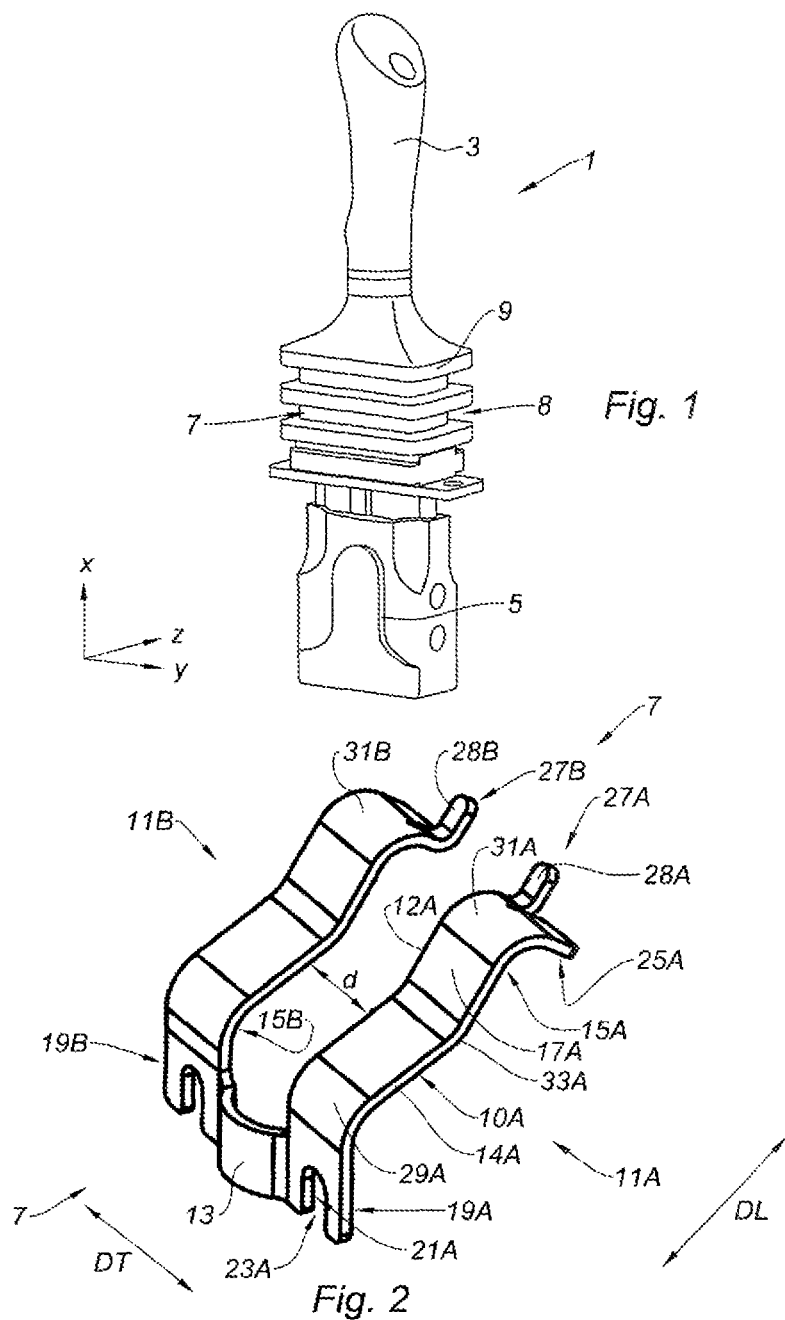

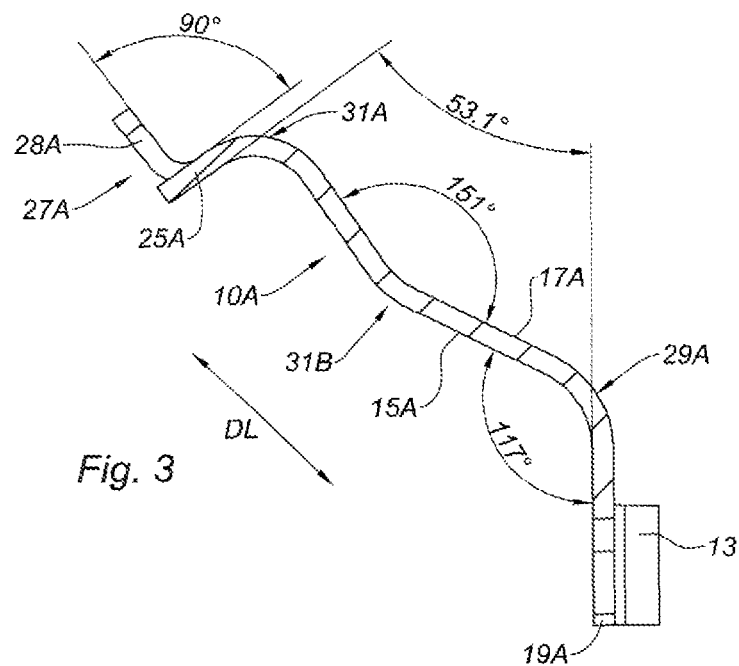
Fig. 3
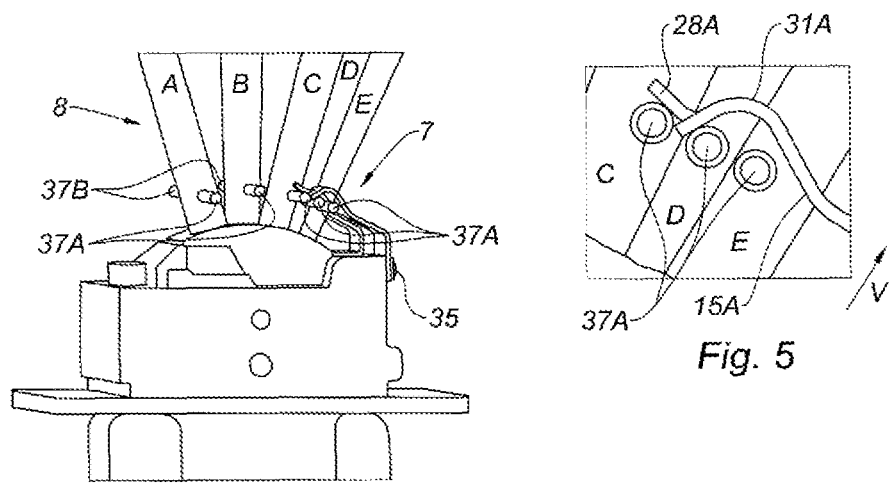
Fig. 4
Fig. 5

POSITIONING DEVICE FOR A REMOTE CONTROL OF A HEAVY DUTY VEHICLE OR AN AGRICULTURAL VEHICLE

This application claims priority under 35 U.S.C. § 119 to patent application number EP 14190833.5, filed on October 29 in the European Patent Office, the disclosure of which is incorporated herein by reference in its entirety.

BACKGROUND

The present invention relates to a positioning device for a hydraulic and/or electronic remote control of a heavy duty vehicle or agricultural vehicle, in particular a handler or a foot pedal.

It is known to achieve remote controls of a heavy duty vehicle or agricultural vehicle comprising an actuator and a body, the actuator being moveable with respect to the body according to at least one degree of freedom of movement based on a displacement trajectory.

The relative position of the actuator with respect to the body allows defining a control to be applied to a system controlled by remote control. By way of example, a lever of hydraulic handler is capable of taking several positions, each position corresponding to a certain hydraulic pressure and hence to a determined behavior of the handler.

Certain positions of the actuator may also correspond to distinct control modes, capable for example, according to the usage, of modifying the stability of the machine bearing the handler, and jeopardizing the safety of the operator using it if this control mode is engaged in an undesired manner by the user. By way of example, it is known to define a control position called "float" in certain hydraulic systems, corresponding to an absence of force exerted on the system to be controlled, this position corresponding to a behavior of the system substantially different from that of the other positions of the actuator in which a control of a force depending on the position of the actuator, for example proportional, is applied.

It is known from the state of the art to achieve systems of mechanical holding of the lever of a handler in a determined position by means of at least one indexing means. These devices are described in documents U.S. Pat. No. 2,958,233 and U.S. Pat. No. 3,401,574. These devices have a complexity and a bulk inconvenient for achieving a control assembly of a handler.

SUMMARY

The purpose of the present invention is to resolve all or part of the aforementioned drawbacks.

To this end, the present invention relates to a positioning device for a remote control of a heavy duty vehicle or agricultural vehicle, in particular a handler or a foot pedal, the remote control comprising an actuator and a body, the actuator being moveable with respect to the body according to at least one degree of freedom of movement along a displacement trajectory, characterized in that positioning device comprises an elastic element comprising a fastening portion intended to be secured to the body of the remote control and a retaining portion arranged to cooperate with the actuator at a threshold position delimiting a first portion of the displacement trajectory, and a second portion of the displacement trajectory, in such a manner as to oppose the movement of the actuator according to its displacement trajectory along at least one displacement direction upon switching of said threshold position and allow switching at the threshold position in said displacement direction as a result of the application of a threshold switching force exerted on the actuator, the threshold switching force being higher than the displacement force necessary for the movement of the actuator on the first portion of the displacement trajectory or the second portion of the displacement trajectory.

Thanks to the dispositions according to the invention, the operator consciously changes the position of the lever during the switching of the threshold position. His mastery of the changes in behavior of the handler is thus improved. The level of safety of the operator is thereby increased. The device also has a simple and robust structure.

According to an aspect of the invention, the retaining portion is arranged to fade during the switching of the actuator in such a manner as to allow the switching of the actuator at the threshold position.

According to an aspect of the invention, the fastening portion comprises a positioning element for positioning the elastic element on the body of the remote control.

According to an aspect of the invention, the positioning element comprises an oblong light, Open on the end of the elastic element, on a portion of the width of the elastic element.

These dispositions according to the invention allow an easier and more precise adjusting of the position of the device for positioning a lever of a handler. A more precise adjusting of the position allows providing in a more fitted manner the threshold switching force to be exerted by the operator.

According to an aspect of the invention, the actuator is moveable with respect to the body according to a rotational movement with respect to an axis.

According to an aspect of the invention, the fastening portion and the retaining portion of the elastic element respectively form two elongated portions together forming an angle ranging between 40° and 60°.

According to an aspect of the invention, an angle of inclination between the fastening portion and the retaining portion of the elastic element ranges between 45° and 55°.

According to an aspect of the invention, the angle of inclination between the fastening portion and the retaining portion of the elastic element is 53°.

According to an aspect of the invention, the elastic element has a flattened and elongated shape, in particular a blade shape, comprising a first main face and an opposite second main face.

According to an aspect of the invention, the retaining portion is intended to cooperate with a stop element, secured to the actuator.

According to an aspect of the invention, the elastic element comprises a guiding element against which the actuator is intended to bear against in a displacement in the direction of the threshold position.

According to an aspect of the invention, the guiding element is adjacent to the retaining portion.

According to an aspect of the invention, an angle of inclination between the retaining portion and the guiding portion ranges between 80° and 100°.

According to an aspect of the invention, the angle of inclination between the retaining portion and the guiding portion is of 90°.

According to an aspect of the invention, the guiding element comprises a tab.

According to an aspect of the invention, the guiding element is integral with the elastic element.

According to an aspect of the invention, the guiding element protrudes at the end of the elastic element, on a portion of a width as the elastic element.

The guiding element ensures the switching of the lever stop element opposite the inner face and thus prevents the switching of the lever stop element opposite the outer face.

According to an aspect of the invention, the elastic element comprises a first curvature comprising a first concavity of the first face of the elastic element and along a longitudinal direction of the elastic element.

According to an aspect of the invention, the first curvature is adjacent to the fastening point.

According to an aspect of the invention, the first curvature defines an angle ranging between 110° and 130°.

According to an aspect of the invention, the first curvature defines an angle ranging between 115° and 120°.

According to an aspect of the invention, the first curvature defines a 117° angle.

According to an aspect of the invention, the elastic element comprises a second curvature comprising a second concavity of the first face of the elastic element and along the longitudinal direction.

According to an aspect of the invention, the second curvature is adjacent to the retaining portion or forms the retaining portion.

According to an aspect of the invention, the elastic element comprises a third curvature comprising a third concavity of the second face and along the longitudinal direction.

According to an aspect of the invention, the third curvature is disposed between the first curvature and the second curvature along the longitudinal direction of the elastic element.

According to an aspect of the invention, the third curvature defines an angle ranging between 140° and 160°.

According to an aspect of the invention, the third curvature defines an angle ranging between 145° and 155°.

According to an aspect of the invention, the third curvature defines a 151° angle.

The triple curvature of the blade and the aforementioned angles ensure a good mechanical hold endurance-wise. The aforementioned angles also allow defining the threshold switching force to be exerted by the operator.

According to an aspect of the invention, the positioning device comprises a first elastic element and a second elastic element connected together, the first elastic element comprising a first retaining portion and the second elastic element comprising a second retaining portion, the first retaining portion and the second retaining portion being spaced apart from each other.

According to an aspect of the invention, the first and second elastic elements are connected by a connecting element, adjacent to a first and a second fastening portion of the elastic elements respectively.

According to an aspect of the invention, the first retaining portion and the second retaining portion are spaced apart from each other by a distance higher than a dimension of the actuator along a transversal direction of the positioning device, in a cooperation area of the actuator and the actuator positioning device.

According to an aspect of the invention, the first elastic element is intended to cooperate with a first stop element and the second elastic element is intended to cooperate with a second stop element, the first and second stop elements being disposed on either side of the lever.

These dispositions allow the actuator to switch between the elastic elements, thus, providing a better distribution of the forces on the device for positioning an actuator when the operator exerts the threshold switching force.

According to an aspect of the invention, the positioning device is achieved from a corrosion resistant material.

According to an aspect of the invention the positioning device has undergone, during its producing, a surface treatment in order to make it corrosion resistant.

These dispositions according to the invention prevent the appearance of micro-cracks which can weaken the positioning device and lead to its rupture.

The present invention also relates to a remote control of a heavy duty vehicle or agricultural vehicle, in particular a handler or a pedal, comprising an actuator and a body, the actuator being moveable with respect to the body according to at least one degree of freedom of movement according to a displacement trajectory and a positioning device in accordance with any one of the abovementioned features.

BRIEF DESCRIPTION OF THE DRAWINGS

Other features and advantages of the present invention will become apparent in light of the following description and upon examination of the accompanying drawings, in which:

FIG. 1 represents an assembly for controlling a handler;

FIG. 2 represents the device for positioning a lever of a handler in three dimensions;

FIG. 3 represents a longitudinal section of the device for positioning a lever of a handler;

FIG. 4 represents the device for positioning a lever of a handler in operation;

FIG. 5 represents a portion of the device for positioning a lever of a handler in operation;

DETAILED DESCRIPTION

Figure 6:
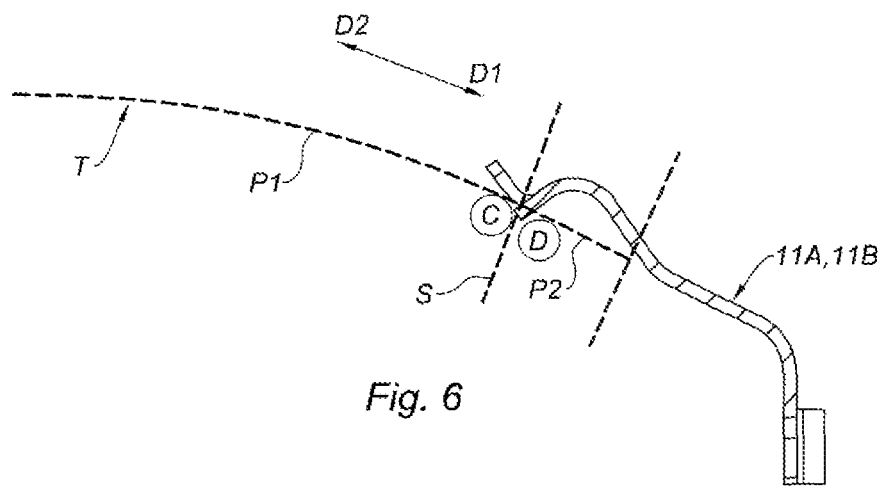
FIG. 6 represents the trajectory portions of the actuator in connection with the positioning device.

On all these figures, identical or similar references designate identical or similar members or assemblies of members.

FIG. 1 represents a remote control of heavy duty vehicle or agricultural vehicle of type handler 1. The handler comprises a lever 3 forming an actuator added onto a body 5. A device 7 for positioning the lever 3 is disposed between the lever 3 and the body 5. The positioning device 7 is protected by bellows 9 through which it is visible by transparence. The lever 3 is moveable in rotation around axis 2 with respect to the body 5. The lever 3 is able to follow a trajectory according to such a degree of freedom.

The positioning device 7 is achieved from a corrosion resistant material, for example stainless steel. This allows preventing the appearance of micro-cracks which can weaken the positioning device 7 and lead to it rupturing.

FIGS. 2 and 3 represent the positioning device 7. In this embodiment, the positioning device 7 comprises two elastic elements 11A, 11B, connected by a connecting element 13.

The elastic elements 11A and 11B are spaced apart by a distance d, along a transversal direction DT, greater than the dimensions of the lever 3 in a cooperating area 8 of the lever 3 and elastic elements 11A, 11B.

The elastic elements 11A and 11B have a similar structure and operation. The elastic element 11A will be described hereinafter. The same description applies to the elastic element 11B. In the rest of the present description, the elements pertaining to the elastic element 11A will bear the letter "A" as a suffix to their numerical reference and the elements pertaining to the elastic element 11B will bear the letter "B" as a suffix to their numerical reference. The elements bearing the same numerical reference, but having two different suffixes are substantially similar.

The elastic element 11A comprises a first main face shown as an inner face 15A and an opposite second main face shown as an outer face 17A. The element 11A has an elongated shape along a longitudinal direction DL. In this embodiment, the elastic element 11A has the shape of a blade 10A. The elastic element 11A comprises an internal edge 12A, adjacent to the connecting element 13, and an external edge 14A, opposite the internal edge 12A.

The elastic element 11A comprises a fastening portion 19A. The fastening portion 19A comprises an oblong light 21A, opening onto an aperture 23A at the end of the elastic element 11A along the longitudinal direction DL. The fastening portion 19A allows fastening the elastic element 11A on the body 5, facing the inner face 15A. The oblong light 21A allows an easy and precise positioning of the positioning device 7.

The fastening portion 19A is adjacent to the connecting element 13, as well as the fastening portion 19B of the elastic element 11B. The position of the connecting element 13 with respect to the elastic elements 11A, 11B, allow the lever 3 to follow its trajectory between the elastic elements 11A, 11B.

The elastic element 11A comprises a retaining portion 25A. The retaining portion 25A is intended to cooperate with the lever 3 in order to maintain it in a determined position along its trajectory. A guiding element 27A comprises a tab 28A, integrally formed with the retaining portion 25A. The tab 28A protrudes towards the end of the retaining portion 25A along the longitudinal direction DL, on a portion of the width of the elastic element 11A. The tab 28A is adjacent to the internal edge 12A of the elastic element 11A. In this embodiment, the tab 28A and the retaining portion 25A define an angle of around 90°.

The retaining portion 25A and the fastening portion 19A together define an angle ranging between 50° and 60°. According to a preferred embodiment of the invention, the retaining portion 25A and the fastening portion 19A together define an angle of 53.1°.

The elastic element 11A comprises a first curvature 29A along the longitudinal direction DL. The first curvature 29A comprises a concavity of the inner face 15A. The first curvature 29A is adjacent to the fastening portion 19A. The first curvature 29A defines an angle ranging between 110° and 120°. According to a preferred embodiment of the invention, the first curvature 29A defines an angle of 117°.

The elastic element 11A comprises a second curvature 31A along the longitudinal direction DL. The second curvature 31A comprises a concavity of the inner face 15A. The second curvature 31A is adjacent to the retaining portion 25A.

The elastic element 11A comprises a third curvature 33A along the longitudinal direction DL. The third curvature 33A comprises a concavity of the outer face 17A. The third curvature 31A defines an angle ranging between 145° and 155°. According to a preferred embodiment of the invention, the third curvature 31A defines an angle of 151°.

The triple curvature of the elastic element 11A allows ensuring a good mechanical hold endurance-wise of the positioning device 7.

FIGS. 4 to 6 represent the positioning device 7 in operation.

At the fastening portions 19A and 19B, the positioning device 7 is fastened to the body 5 by fastening elements 35, for example screws.

The lever 3 comprises two stop elements 37A, 37B, disposed on either side of the lever 3, and respectively cooperating with the elastic elements 11A, 11B.

The lever 3 is moveable with respect to the body 5 according to a degree of freedom of rotation along a displacement trajectory T.

The retaining portions 25A, 258 are arranged to cooperate with the actuator at a threshold position S delimiting a first portion P1 of the displacement trajectory, and a second portion P2 of the displacement trajectory.

The trajectory of the lever 3 comprises several operating positions distributed over said trajectory. Positions of the lever A, B, C, D, and E are represented on FIGS. 4 to 6. The positions A and B disposed in the first portion P1 of the trajectory T do not solicit the positioning device 7. The position B corresponds to the neutral or rest state of the handler. Position C corresponds to a certain behavior of the handler. Positions D and E disposed in the second portion P2 of the trajectory T correspond to another behavior of the handler, distinct from the behavior of the handler when the lever 3 is in the first portion P1 of the trajectory T. For example, these distinct behaviors correspond to distinct uses of the handler.

When the operator places the lever in position C, the stop elements 37A, 37B come in contact with the tab 28A and a tab 28B of the elastic element 11B respectively, and are placed in abutment with the latter.

Figure 7:
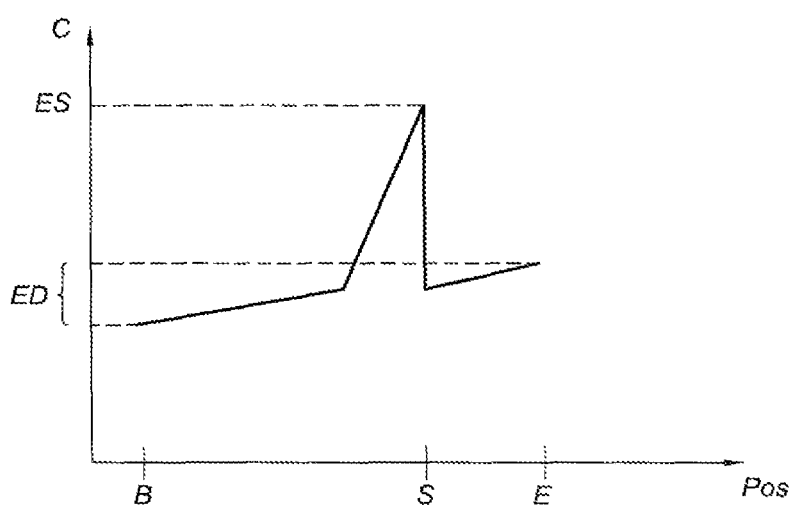
FIG. 7 represents a diagram schematically describing the progress of the force to be applied by a user in order to displace the actuator on the trajectory of the actuator.

In order to displace the lever 3 along its trajectory and towards the position D, switching via the threshold position S, the operator must exert a threshold switching force ES, or friction point force, greater than the necessary displacement force ED for the switching of the lever 3 between any two positions of the displacement trajectory, as is visible on FIG. 7, which represents the progress of the force E to be applied by a user to displace the actuator on the trajectory of the actuator based on the position Pos on the trajectory T of the lever along a displacement direction, for example D1. By way of example, ES has a value in the range of 1 to 2 N·m and ED has a value in the range of 4 to 8 N·m.

The threshold switching force ES to be exerted hence indicates to the operator that if he moves the lever 3 along its trajectory for example in the direction D1 towards the position D, it will reach the position D thus leading to a change in the behavior of the handler. The operator may thus take the decision, consciously to displace the lever 3 to the position D. By way of example, it is possible in this manner to indicate the switch from a control mode with application of a pressure proportional to a position of the lever on a jack to a "float" mode, without application of a pressure in the case of a hydraulic remote control.

When the operator exerts the threshold switching force ES, the elastic elements 11A, 11B are displaced by elasticity, along a direction V, under the constraint exerted by the stop elements 37A, 37B against which the elastic elements 11A, 11B press, the stop elements 37A, 37B being displaced along the trajectory of the lever 3. The elastic elements 11A, 11B are thus displaced and fade until the lever 3 reaches the position D, in which the stop elements 37A, 37B are pressed against the inner face 15A and an inner face 15B of the elastic element 11B, at the concavity of the second curvature 31A and a concavity of a second curvature 31B of the elastic element 11B respectively.

The guiding elements 27A, 27B allow ensuring a systematic switching of the stop elements 37A, 37B respectively facing the inner faces 15A, 15B respectively of the elastic elements 11A, 11B respectively.

The operator may then displace the lever 3 along its trajectory between positions D and E.

In the same manner, when the lever is in position D, and that the operator wishes to displace it to the position C by switching via the threshold position S, the stop elements 37A, 37B press against the inner faces 15A, 15B respectively of the elastic elements 11A, 11B respectively, at the concavities of the second curvatures 31A, 31B respectively. The elastic elements 11A, 11B are then displaced by elasticity, along direction V, under the constraint exerted by the stop elements 37A, 37B respectively, until the lever 3 reaches the position C.

Obviously, the present invention is not limited to the embodiment described and represented, provided by way of non-limiting and illustrating example.

What is claimed is:

1. A remote control of a vehicle comprising:
a body;
an actuator pivotably connected to the body and including at least one stop element that is moveable with respect to the body along a displacement trajectory; and
a positioning device mounted on the body and having a first elastic element, the first elastic element including
a fastening portion fixedly secured to the body; and
a first retaining portion extending from the fastening portion and configured for movement relative to the body, the first retaining portion further configured to engage the at least one stop element when the at least one stop element is at a threshold position of the displacement trajectory, such that the first retaining portion opposes movement along the displacement trajectory of the actuator at the threshold position,
wherein the first elastic element is spaced apart from the at least one stop element when the actuator is at a position along the displacement trajectory other than the threshold position,
wherein the positioning device further includes a second elastic element connected to the first elastic element by a connecting element,
wherein the second elastic element includes a second retaining portion,
wherein the connecting element extends from the first retaining portion and the second retaining portion, and
wherein the first retaining portion and the second retaining portion are spaced apart from each other.

2. The remote control according to claim 1, wherein the first retaining portion and the second retaining portion are spaced apart from each other by a distance higher than a dimension of the actuator along a transversal direction of the positioning device, in a cooperation area of the actuator and the positioning device.

3. The remote control according to claim 1, wherein:
the actuator is movable to a first end of the displacement trajectory and to an opposite second end of the displacement trajectory,
the first retaining portion is spaced apart from the at least one stop element when the actuator is at the first end of the displacement trajectory,
the first retaining portion is spaced apart from the at least one stop element when the actuator is at the second end of the displacement trajectory, and
the first retaining portion engages the at least one stop element only when the actuator is at the threshold position.

4. The remote control according to claim 1, wherein the at least one stop element defines a circular surface configured to engage the first retaining portion.

5. The remote control according to claim 1, wherein the at least one stop element pushes the first retaining portion away from a pivot axis of the actuator during a switching of the actuator out of the threshold position.

6. The remote control according to claim 1, wherein the fastening portion includes a positioning element configured to position the first elastic element on the body.

7. The remote control according to claim 1, wherein the fastening portion and the first retaining portion form an angle of 40° to 60°.

8. The remote control according to claim 1, wherein the first elastic element has a flattened and elongated shape comprising a first main face and an opposite second main face.

9. The remote control according to claim 8, wherein the first elastic element comprises a first curvature having a first concavity of the first main face.

10. The remote control according to claim 1, wherein:
the first retaining portion includes an outer face and an inner face,
when the actuator is moved to the threshold position in a first direction (i) the outer face of the first retaining portion is configured to engage the at least one stop element, and (ii) the inner face of the first retaining portion is spaced apart from the at least one stop element,
when the actuator is moved to the threshold position in a second direction (i) the inner face of the first retaining portion is configured to engage the at least one stop element, and (ii) the outer face of the first retaining portion is spaced apart from the at least one stop element, and
the first direction is opposite the second direction.

11. The remote control according to claim 10, wherein:
the first elastic element includes a tab extending from the first retaining portion, and
the tab and the outer face are configured to contact the at least one stop element when the actuator is moved to the threshold position in the first direction.

12. The remote control according to claim 10, wherein:
the first elastic element comprises a guiding element against which the at least one stop element is configured to bear against when the actuator is moved to the threshold position in the first direction, and
the guiding element is adjacent to the first retaining portion.

13. A remote control of a vehicle, comprising:
a body;
an actuator pivotably connected to the body and including at least one stop element that is moveable with respect to the body along a displacement trajectory; and
a positioning device mounted on the body and having an elastic element, the elastic element including
a fastening portion fixedly secured to the body; and
a retaining portion extending from the fastening portion and configured for movement relative to the body, the retaining portion further configured to engage the at least one stop element when the at least one stop element is at a threshold position of the displacement trajectory, such that the retaining portion opposes movement along the displacement trajectory of the actuator at the threshold position, wherein the elastic element is spaced apart from the at least one stop element when the actuator is at a position along the displacement trajectory other than the threshold position, wherein the elastic element has a flattened and elongated shape comprising a first main face and an opposite second main face, wherein the elastic element comprises a first curvature having a first concavity of the first main face, and wherein the elastic element comprises a second curvature having a second concavity of the first main face.

14. The remote control according to claim 13, wherein the elastic element comprises a third curvature having a concavity of the second main face.

\* \* \* \* \*